United States Patent Office 2,697,195
Patented Dec. 14, 1954

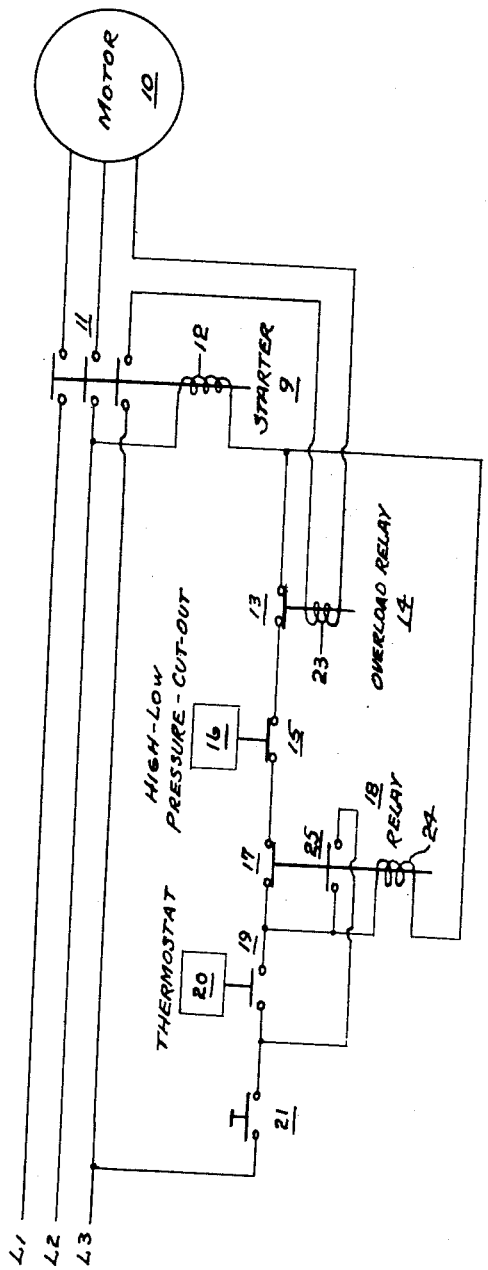

2,697,195

MOTOR PROTECTION CIRCUIT

Arthur W. Courtney, Jr., Weymouth, Mass., assignor to Westinghouse Electric Corporation, East Pittsburgh, Pa., a corporation of Pennsylvania Application January 2, 1953, Serial No. 329,207

3 Claims. (Cl. 318—452)

This invention relates to safety controls for electric motors, and relates more particularly to safety controls for electric motors driving refrigerant compressors.

Relatively large air conditioning units usually have high and low pressure cut-outs, and may have overload relays. The high pressure cut-out may deenergize the motor driving a compressor when a temporary failure occurs in the water supply for cooling the condenser or when the water pressure falls too low for satisfactory condenser cooling. The low pressure cut-out may deenergize the motor when the unit has operated continuously for a long period of time when the space served has dropped either to a very low temperature or humidity or both. A temporary drop in the voltage of the power supply may cause the overload relay to deenergize the compressor motor.

Such a unit usually has its safety controls within a cabinet so that it is usually necessary to call a service man to open the cabinet and reset the control which has operated. This not only involves undesired expense but results in periods of time during which there is no air cooling. Automatic resetting of the controls or automatic restarting of the motor is not practical for if this was done the unit might operate intermittently without anyone being aware there was a legitimate reason for the operation of one or more of the safety controls.

This invention provides a control for restarting such a motor after a safety control has operated, using a simple on-off switch which may be mounted on the exterior of a cabinet of an air conditioning unit, or in any other convenient location as for remote control. To restart a motor requires no more than opening, followed by the closing, of the switch.

An object of this invention is to provide a simple, convenient control for restarting an electric motor which a safety control has deenergized.

The invention will now be described with reference to the drawing which is a circuit schematic of one embodiment of the invention.

The electric motor 10 for driving a refrigerant compressor which is not illustrated, is energized through the switch 11 of the starter 9 from the lines L1, L2 and L3 of a three-phase electric system. The energizing coil 12 of the starter is connected to the line L2 and in series with the switch 13 of the overload relay 14, the switch 15 of the high-low pressure cut-out 16, the switch 17 of the relay 18, the switch 19 of the thermostat 20, and the selector switch 21, to the line L1.

The energizing switch 23 of the overload relay 14 is connected in the line L3 between the switch 11 and the motor 10.

The energizing winding 12 of the starter switch 9 is connected to the line L2, and in series with the energizing winding 24 of the relay 18 to the junction of the switches 19 and 17, this connection resulting, when the switches 13, 15 and 17 are closed, in the relay winding 24 being short-circuited by these switches in series so that it cannot be energized by the closing of the switch 21 if the switches 13, 15 and 17 are closed, and can be energized from the lines L1 and L2 through closed switches 21 and 19 when either of the switches 13, 15 or 17 are open.

The energizing winding 12 of the starter requires more current to operate than does the energizing winding 24 of the relay 18 so that when the relay 18 is energized, the starter 9 is not energized and can be energized only when the switches 21, 19, 17, 15 and 13 are closed.

When the relay 18 is energized, it opens the switch 17 thus preventing the automatic closing of the switches 15 or 13 when a temporary fault has disappeared, from energizing the starter to restart the motor 10. When the relay 18 is energized, it also closes the switch 24 which is connected across the thermostat switch 19.

*Operation*

In operation, assuming the selector switch 21 is closed, and the thermostat 20 is calling for cooling so that its switch 19 is closed, and assuming further that neither of the safety switches 15 or 13 has been opened by the safety controls, then the starter 9 will be energized, and will close its switch 11 connecting the motor 10 to the electric lines. At this time the relay 24 will be deenergized since its winding 24 will be short-circuited by the closed switches of the safety controls.

If either or both of the safety controls 16 or 14 operate because of overload or other difficulty, the switches 15 or 13 or both will open, deenergizing the motor starter 9 causing it to open its switch 11, and disconnecting the short-circuit across the relay winding 24, which since it is connected in series with the energizing circuit of the motor starter 9, prevents the latter from being energized so that the motor cannot be restarted when either or both of the safety switches automatically reclose their switches when the temporary overload or other temporary difficulty has disappeared.

To restart the motor, an operator would merely open and reclose the switch 21 which would be on the outside of the front panel of a unit or in some other convenient location. The opening of the switch would cause the relay 18 to be deenergized and to close its switch 17 so that the energizing circuit of the motor starter 9 would again be closed when the switch 21 is again closed.

Since the thermostat 20 by first opening and then closing its switch 19 could automatically restart the motor 10 in the same way that opening and closing of the switch 21 does, when the switch 21 is closed, the thermostat switch 19 has the relay switch 25 shunted thereacross and which is closed when the relay 18 is energized.

The foregoing description of operation applies to restarting of the motor when temporary abnormal conditions cause the safety controls to stop the motor. If there is anything wrong with the equipment which requires correction, this will be indicated by the frequent requirement for restarting the motor so that steps can be taken to remedy the conditions.

While one embodiment of the invention has been described for the purpose of illustration, it should be understood that the invention is not limited to the exact circuit and circuit components illustrated, since modifications thereof may be suggested by those skilled in the art, without departure from the essence of the invention.

What is claimed, is:

1. A control circuit comprising an electric motor, a supply circuit for said motor, a starter having a switch for connecting said supply circuit to said motor, said starter having an energizing winding, a safety control having a normally closed switch, a relay having an energizing winding and having a normally closed switch, a selector switch, connections connecting said selector switch, said relay switch, said safety control switch and said starter winding in series to said supply circuit, other connections connecting said starter winding, said relay winding and said selector switch in series to said supply circuit, and connecting said relay winding to said first mentioned connections so that normally said relay winding is shunted by said relay and safety control switches in series, said starter winding requiring a larger current to operate said starter than is required by said relay winding to operate said relay whereby when said selector switch is closed, said relay winding can be energized to operate said relay to open its switch without said starter winding being energized to operate said starter to close its switch, when said safety switch has opened and caused the energization of said relay winding and the deenergization of said starter winding, said relay winding being deenergized by the opening of said selector switch and closing said relay switch for completing said first mentioned connections when said selector and safety control switches have again closed.

2. A control circuit as claimed in claim 1 in which a load responsive control has a switch in series with said selector switch, said relay winding and said starter winding, and said relay has a switch shunted across said last mentioned switch when said relay winding is energized.

3. A control circuit as claimed in claim 2 in which the motor is for driving a refrigerant compressor of an air cooling unit, and the load responsive control is a thermostat responsive to the temperature of the space cooled by the unit.

References Cited in the file of this patent

UNITED STATES PATENTS

| Number | Name | Date |
|---|---|---|
| 2,050,076 | Wilms | Aug. 4, 1936 |
| 2,068,600 | Frese | Jan. 19, 1937 |
| 2,389,396 | Winchester | Nov. 20, 1945 |